US008742280B2

(12) United States Patent
Vogel

(10) Patent No.: US 8,742,280 B2
(45) Date of Patent: Jun. 3, 2014

(54) SYSTEMS AND METHODS FOR STATISTICALLY ANALYZING WELDING OPERATIONS

(75) Inventor: Bernard J. Vogel, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 634 days.

(21) Appl. No.: 12/971,881

(22) Filed: Dec. 17, 2010

(65) Prior Publication Data

US 2011/0163072 A1    Jul. 7, 2011

Related U.S. Application Data

(60) Provisional application No. 61/293,070, filed on Jan. 7, 2010.

(51) Int. Cl.
*B23K 9/00* (2006.01)
(52) U.S. Cl.
USPC .................. 219/74; 219/130.33; 219/130.31; 219/130.32
(58) Field of Classification Search
USPC ......... 219/74, 130.33, 130.1, 130.21, 130.31, 219/130.32, 130.4, 130.5, 130.51
See application file for complete search history.

(56) References Cited

U.S. PATENT DOCUMENTS

| 5,708,253 | A | 1/1998 | Bloch et al. |
| 6,091,048 | A * | 7/2000 | Lanouette et al. ....... 219/130.21 |
| 6,248,975 | B1 * | 6/2001 | Lanouette et al. ....... 219/130.21 |
| 6,362,456 | B1 | 3/2002 | Ludewig et al. |
| 6,563,085 | B2 * | 5/2003 | Lanouette et al. ......... 219/130.5 |
| 2009/0200282 | A1 | 8/2009 | Hampton |
| 2010/0089889 | A1 | 4/2010 | Hutchison |

FOREIGN PATENT DOCUMENTS

CN            201342544 Y        11/2009

OTHER PUBLICATIONS

International Search Report from PCT application No. PCT/US2001/020141, dated Sep. 13, 2012, 9 pages.

* cited by examiner

*Primary Examiner* — Dana Ross
*Assistant Examiner* — John Wasaff
(74) *Attorney, Agent, or Firm* — Fletcher Yoder P.C.

(57) ABSTRACT

A welding system including a welding power source including power conversion circuitry adapted to receive primary power and to convert the primary power to a weld power output for use in a welding operation and a controller communicatively coupled to the welding power source are provided. The controller is adapted to determine a statistical signature of at least one parameter of a welding process and to utilize the statistical signature to determine at least one of an electrode type, an electrode diameter, and a shielding gas type during the welding operation.

6 Claims, 11 Drawing Sheets

SYSTEMS AND METHODS FOR STATISTICALLY ANALYZING WELDING OPERATIONS

CROSS REFERENCE TO RELATED APPLICATIONS

This application is a Non-Provisional patent application of U.S. Provisional Patent Application No. 61/293,070 entitled "Optimizing the Setting of a Welding System Using Real Time Statistical Analysis of Parameters of the Welding Process", filed Jan. 7, 2010, which is herein incorporated by reference.

BACKGROUND

The invention relates generally to welding systems and, more particularly, to systems and methods for statistically analyzing a welding operation.

Welding is a process that has become ubiquitous in various industries for a variety of types of applications. For example, welding is often performed in applications such as shipbuilding, aircraft repair, construction, and so forth. During such welding processes, a variety of controls are often provided to enable an operator to control one or more parameters of the welding operation. For example, welding systems may have user controls and inputs to allow setting and adjusting of parameters such as the weld process, filler metal or electrode, shielding gas, metal thickness, travel speed, arc force, electronic inductance, hot start, droop, and so forth. Such controls may allow a skilled welder to set and adjust a welding system to operate in the desired manner based on factors such as the electrode type, shielding gas type, weld process, metal thickness, weld conditions, and so forth.

Adjusting and setting such controls on a welding system often requires a welding operator to possess knowledge and skill regarding how to properly set and adjust the controls throughout the welding operation. Improper adjustment of the controls may adversely affect the welding operation, thus leading to undesirable side effects, such as increased spatter, undesirable bead profile or penetration, and so forth, which may present difficulties for the operator to start and maintain the arc. Unfortunately, some welding operators may not have the necessary skill to properly adjust one or more of the controls provided on the welding system. Accordingly, there exists a need for improved welding systems that overcome such drawbacks.

BRIEF DESCRIPTION

In an exemplary embodiment, a welding system includes a welding power source including power conversion circuitry adapted to receive primary power and to convert the primary power to a weld power output for use in a welding operation. The welding system also includes a controller communicatively coupled to the welding power source and adapted to determine a statistical signature of at least one parameter of a welding process and to utilize the statistical signature to determine at least one of an electrode type, an electrode diameter, and a shielding gas type during the welding operation.

In another embodiment, a method of controlling a welding power source includes initializing one or more default settings for the welding operation, establishing a welding arc between a welding electrode and a workpiece, and monitoring at least one of a current waveform and a voltage waveform produced during the welding operation. The method also includes determining, based on the at least one current and/or voltage waveform, a statistical signature of the welding operation during the welding operation and determining, based on the statistical signature, one or more desired settings for the welding operation.

In another embodiment, a controller for a welding power source is adapted to detect initiation of a welding process, to initialize a default setting for one or more parameters for the welding process, to perform a statistical analysis on one or more weld parameter waveforms, and to determine the electrode type being utilized in the welding process based on the performed statistical analysis.

DRAWINGS

These and other features, aspects, and advantages of the present invention will become better understood when the following detailed description is read with reference to the accompanying drawings in which like characters represent like parts throughout the drawings, wherein.

Figure 12:
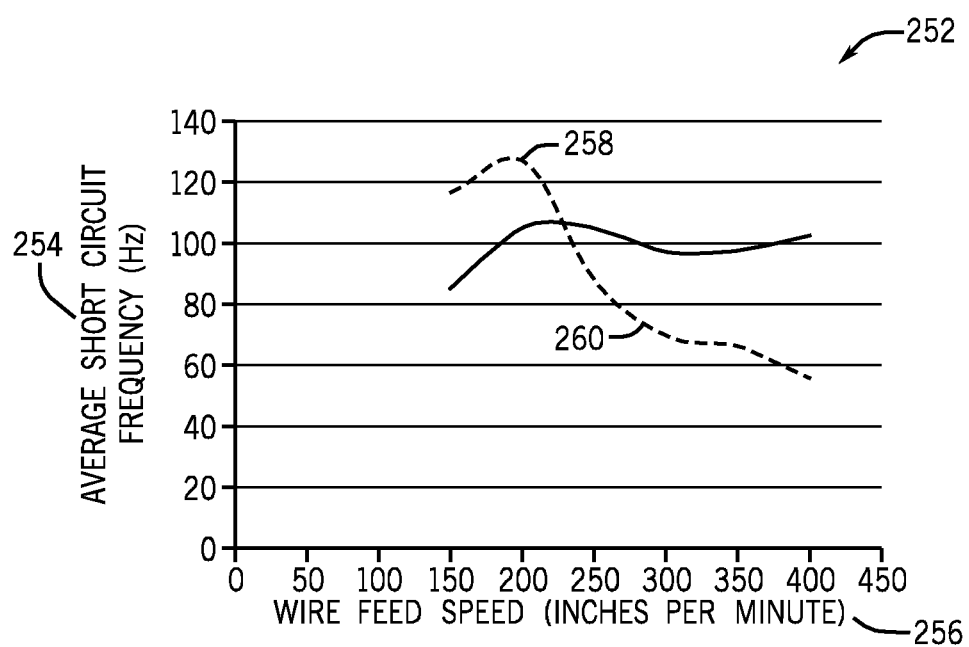
Figure 13:
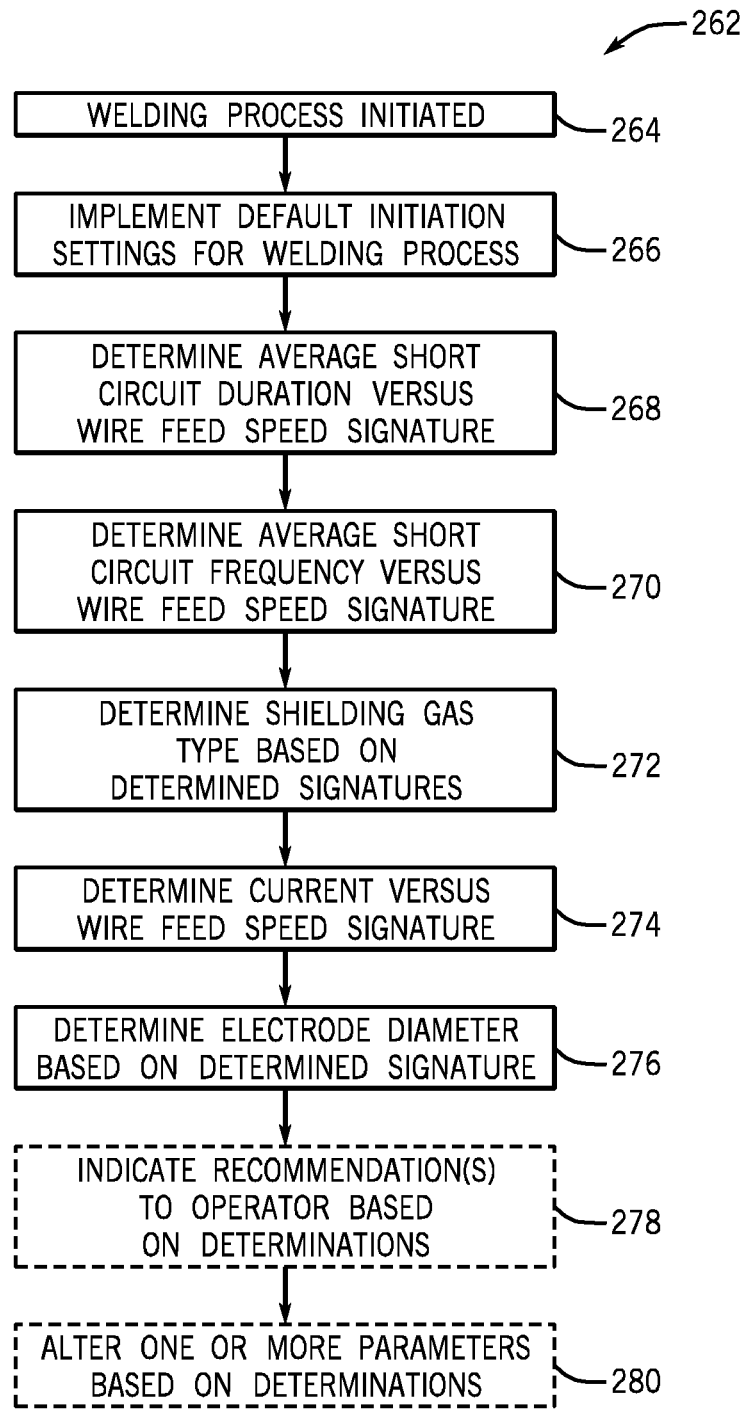

FIG. 12 illustrates an embodiment of a short circuit frequency versus wire feed speed plot showing exemplary statistical signatures associated with a given electrode being utilized in a GMAW welding operation with different shielding gases; and FIG. 13 illustrates an embodiment of a method that may be utilized by a controller to control a GMAW or FCAW process in accordance with embodiments of the present invention.

DETAILED DESCRIPTION

As described in detail below, embodiments are provided of welding systems including a controller adapted to optimize one or more weld settings or parameters based on a statistical analysis of one or more welding waveforms (e.g., a voltage waveform, a current waveform, etc.) or other suitable weld signals. In some embodiments, the statistical analysis yield a statistical signature for the welding process, and the statistical signature may be utilized to determine the type of electrode, the type of filler metal, the type of shielding gas, and so forth, being utilized in the welding process. For example, in one embodiment, the determined statistical signature may be compared to a reference signature to make a determination regarding a weld parameter (e.g., the type of electrode). In some embodiments, the controller may automatically adjust one or more parameters or settings used in the weld process control based on the determined statistical signature. In other embodiments, the controller may indicate to a user that a weld setting or input should be adjusted or may lock out further operation until the desired adjustment is made to the identified settings or parameters.

In some embodiments, the statistical analysis performed by the controller may be utilized to distinguish between two or more types of a consumable or device being utilized in the welding operation. For instance, the controller may be adapted to distinguish between two or more types of welding electrodes or between two or more types of shielding gas. For example, in some stick welding processes, the controller may be adapted to distinguish between a 6010 type electrode and a 7018 type electrode based on the results of the statistical analysis. For further example, in some metal inert gas (MIG) welding processes, the controller may be adapted to distinguish between use of a substantially carbon dioxide shielding gas and an argon and carbon dioxide mix of shielding gas. Indeed, in certain embodiments, the controller may be configured to distinguish between any suitable number of possible consumables or devices being utilized based on the statistical analysis.

Figure 1:
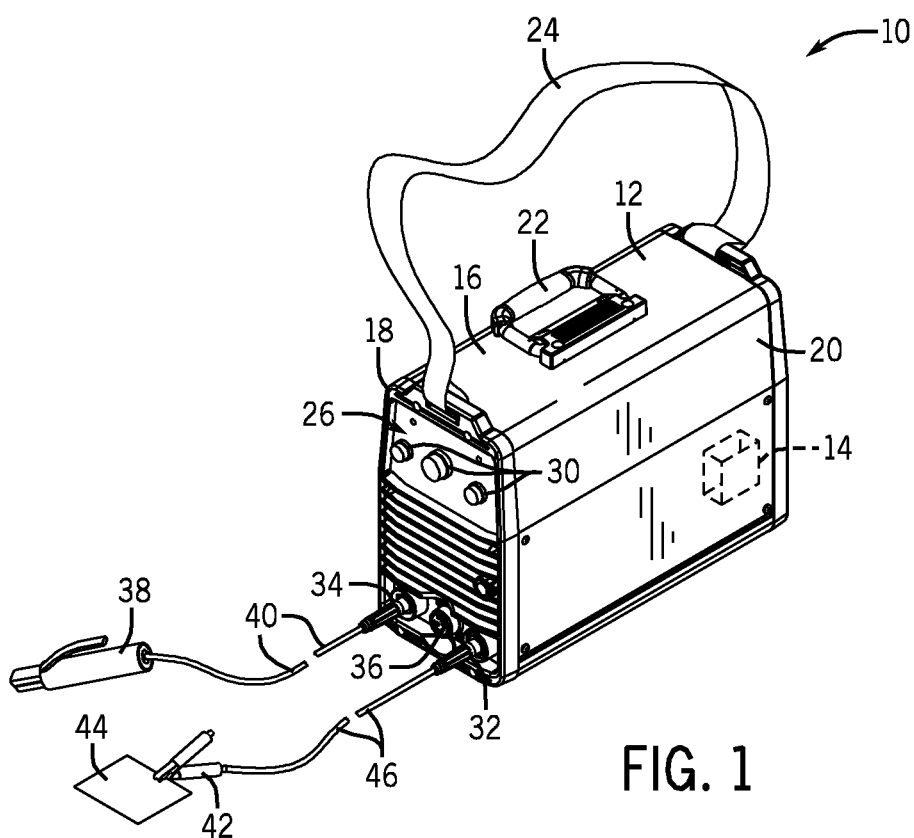
FIG. 1 illustrates an exemplary welding system including a welding power source and a controller disposed therein in accordance with embodiments of the present invention.

Turning now to the drawings, FIG. 1 illustrates an exemplary welding system 10 including a welding power source 12 and a controller 14 disposed therein in accordance with embodiments of the present invention. In the illustrated embodiment, the welding power source 12 includes a top panel 16, a front panel 18, and a side panel 20. The top panel 16 includes a handle 22 and a strap 24 that may be utilized, independently or concurrently, to move the welding power source 12 from one location to another, as desired by a welding operator. However, it should be noted that in many embodiments, the welding power source 12 may not be portable and may be configured for use in a single location. Indeed, any suitable welding power source may be utilized in accordance with embodiments of the present invention, and the illustrated power source is representative of a single, non-limiting embodiment.

The front panel 18 includes a control panel 26 including knobs 30 that may be utilized by an operator to set one or more parameters of the welding operation. For example, in one embodiment, the knobs 30 or other controls located on the control panel 26 may be utilized by an operator to set the desired welding current, voltage and/or wire feed speed. Still further, in some embodiments, other controls may be utilized by an operator to select a welding process, adjust an arc force setting, adjust an electronic inductance setting, input an electrode diameter (e.g., 0.035", 0.045", etc.), input an electrode type (e.g., mild steel), input a shielding gas type (e.g., 100% $CO_2$, 90% Ar with 10% $CO_2$, etc.), and so forth. Indeed, in various embodiments, the control panel 26 may be utilized by an operator to set or adjust any suitable weld parameters or settings.

In the embodiment shown in FIG. 1, the front panel 18 also includes a negative weld output terminal 32, a positive weld output terminal 34, and a remote output terminal 36. The illustrated embodiment is configured for a stick direct current electrode positive (DCEP) welding process. Accordingly, in the illustrated embodiment, an electrode holder 38 is coupled to the positive weld output terminal 34 via cable 40, and a ground clamp 42 clamps a workpiece 44 and is coupled to the welding power source 12 via cable 46 to close the circuit between the welding power source, the electrode, and the workpiece during operation. The remote output terminal 36 may be coupled to one or more remote control devices configured to control one or more parameters of the welding operation from a remote location. For example, in some embodiments, the remote output terminal 36 may connect to a foot pedal control, a handheld control device, a remote user interface, and so forth.

During operation, the welding power source 12 is configured to receive primary power, for example, from a wall outlet or a power grid, and to convert the primary power to a power output suitable for use in the welding operation. Accordingly, when in use, the controller 14 controls one or more electrical components within the welding power source to produce the desired output. For example, the controller 14 may be utilized to store and retrieve settings and parameters utilized for a particular electrode type, filler metal type, shielding gas, and so forth. Further, the controller 14 may facilitate customization of the welding parameters and settings by an operator by receiving and storing the desired settings within a memory in the controller 14. Again, such desired setting or parameters may be communicated to the controller 14 via the user interface 26 located on the welding power source 12.

Still further, as described in more detail below, while the welding operation is occurring, the controller 14 may be configured to perform a statistical analysis of one or more features of the welding operation to determine one or more characteristics of the welding operation, which may be indicative of the electrode type, filler metal type, shielding gas type, and so forth, being utilized. Further, the controller 14 may be configured to distinguish between a predefined number of possible electrode types, shielding gas types, and so forth, during the welding operation. For example, in one embodiment, the controller 14 may perform a statistical analysis of the welding current and voltage waveforms and may utilize the results of such an analysis to determine an optimum set of operating parameters for the given setup of the welding operation being performed. Accordingly, in some embodiments, the controller 14 may adjust parameters of the welding power source 12 during the welding process to optimize operation for the detected condition. In other embodiments, the controller 14 may alert the operator to an optimum set of conditions during the welding process, and the operator may then adjust one or more parameters accordingly via the user interface 28.

Figure 2:
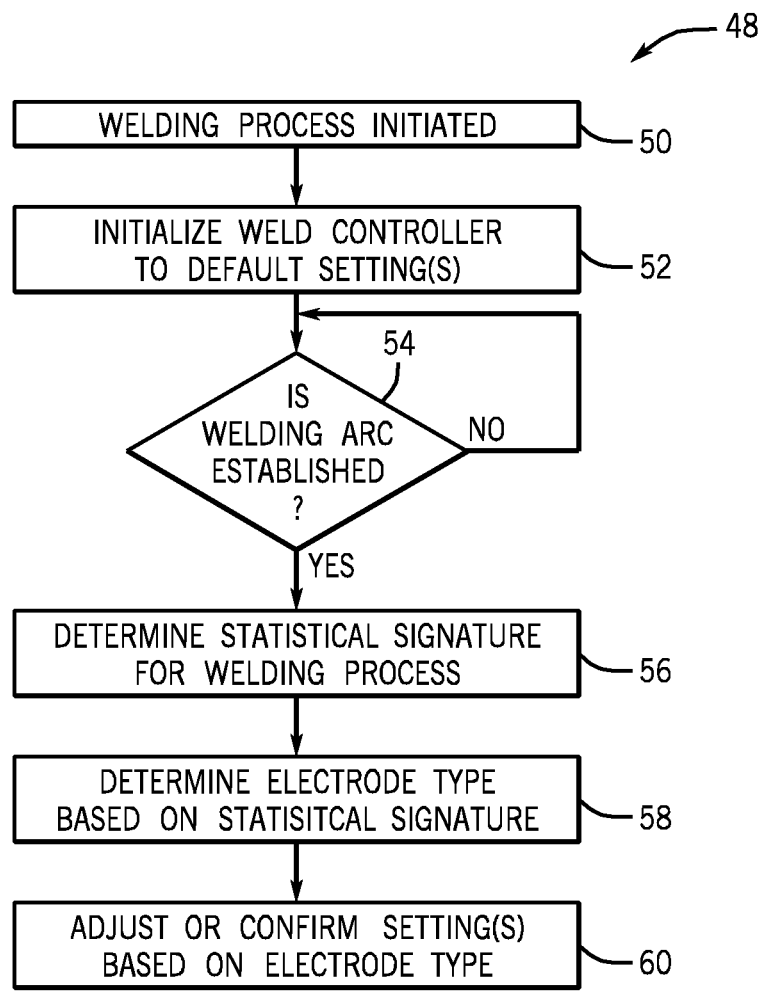
FIG. 2 is a flow chart illustrating an exemplary control method that may be utilized by the controller of FIG. 1 to control a welding process in accordance with embodiments of the present invention.

FIG. 2 is a flow chart illustrating an exemplary control method 48 that may be utilized by the controller of FIG. 1 to control a welding process in accordance with embodiments of the present invention. The method 48 includes the steps of initiating the welding process (block 50) and initializing the weld controller to one or more default settings (block 52). That is, in this embodiment, the controller implements a default set of parameters at the beginning of the weld process before a statistical analysis is performed. Indeed, the default startup set of parameters may be preselected based on the most commonly used electrode for the given welding process, the electrode previously used in the last welding operation that was performed, or any other desired criteria.

The method 48 also includes checking whether the welding arc is established (block 54), and, if not, the controller continues to monitor for the initiation of a welding arc. When a welding arc is established, the controller determines a statistical signature for the welding process (block 56). For example, the controller may statistically analyze the voltage waveform and/or the current waveform during the welding operation to determine a statistical signature. For further example, in one embodiment, the controller may compare the generated voltage and/or current waveforms to one or more reference waveforms stored in the controller memory to determine the statistical signature for the welding process. Once the statistical signature has been determined, the controller may determine an electrode type being utilized in the given welding operation (block 58) and may adjust or confirm one or more weld settings being utilized in the welding operation based on the electrode type (block 60). However, it should be noted that in some embodiments, the controller may be configured to distinguish between two or more electrode types being utilized in the welding operation (e.g., 6010 electrode type vs. 7018 electrode type). Such a feature may enable the controller to adjust one or more weld parameters during the welding operation to optimize performance of the welding system for the given setup. It should be noted that although in the embodiment of FIG. 2, the controller utilizes the statistical signature to determine an electrode type, the statistical signature may be utilized to determine any of a number of parameters of the welding process while the welding operation is occurring in other embodiments.

Figure 3A:
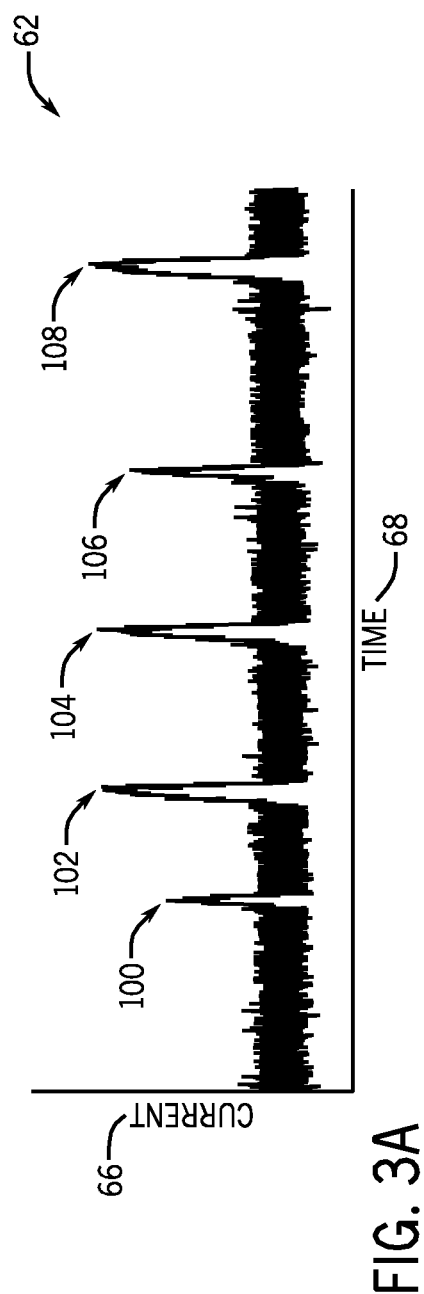
FIG. 3A illustrates an exemplary current versus time plot for a shielded metal arc welding process for a first electrode type in accordance with embodiments of the present invention.
Figure 3B:
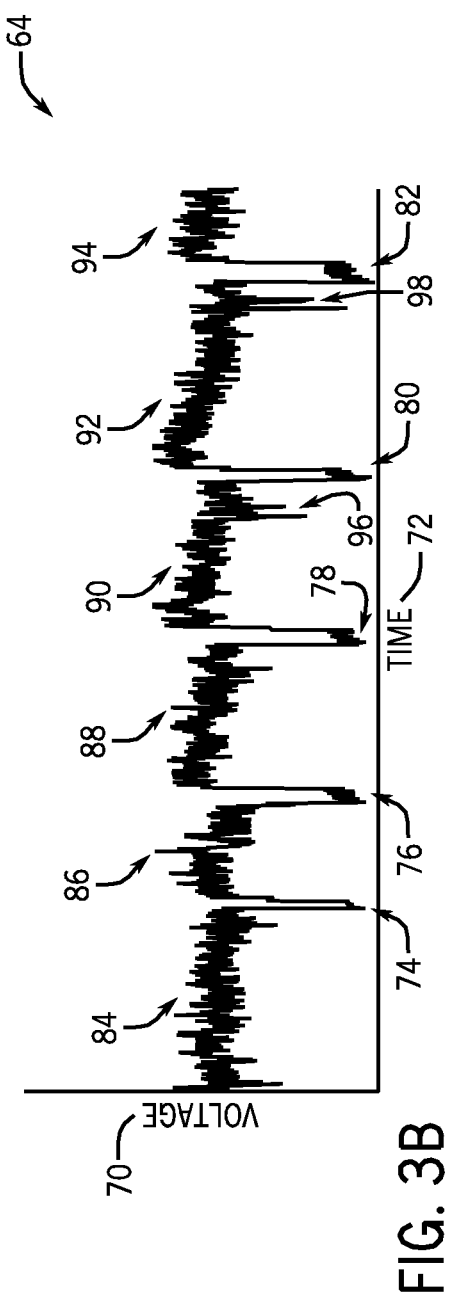
FIG. 3B illustrates an exemplary voltage versus time plot for a shielded metal arc welding process for a first electrode type in accordance with embodiments of the present invention.

FIGS. 3A, 3B, 4A, 4B, and 4C illustrate an exemplary method that may be utilized by the controller to perform a statistical analysis of the weld current and voltage waveforms to determine a statistical signature of a welding process while the welding operation is occurring. Specifically, FIG. 3A and FIG. 3B illustrate a current versus time plot 62 and a voltage versus time plot 64, respectively, for a shielded metal arc welding (SMAW) process for a first electrode type (e.g., E7010, ⅛" diameter). In some embodiments, the controller may perform a statistical analysis on one or both of the current versus time plot 62 and the voltage versus time plot 64 during the welding operation.

As shown, the current versus time plot 62 includes a current axis 66 and a time axis 68. Similarly, the voltage versus time plot 64 includes a voltage axis 70 and a time axis 72. As shown, the voltage plot 64 includes a plurality of short circuit events 74, 76, 78, 80, and 82 which occur during the welding operation and are interspersed with welding arc periods 84, 86, 88, 90, 92, and 94. The short circuit events 74, 76, 78, 80, and 82 may be characterized by a substantial drop in voltage, as indicated on the voltage plot 64, during which time the molten end of the electrode has shorted to the weld pool. In certain embodiments, an arc period may follow a short circuit event after the molten ball has been drawn into the weld pool and an open arc has been reestablished. The voltage plot 64 further includes transient short circuit events 96 and 98, which are characterized by a short duration as compared to the short circuit events. Such transient short circuit events may be a result of a molten ball on the welding electrode momentarily touching the weld pool. Such events (e.g., 98) are often followed by a short circuit event of longer duration (e.g., 82) as the molten ball is drawn into the weld pool.

In some embodiments, the SMAW process may be carried out with a welding power source that utilizes an approximately constant current characteristic (i.e., the output of the welding power source is controlled such that the output current remains at an approximately constant value during the welding operation). In some embodiments, the knobs 30 or other suitable controls may be utilized by the operator to adjust or set the current value according to the requirements of the welding operation. Still further, in certain embodiments, welding power sources that are utilized for the SMAW process may provide further control or modification of the current value during arc initiation, during short circuit events, during moments of high arc voltage, or other dynamic events that occur in the arc. For example, an arc force control may be provided, which causes the output current to increase during a short circuit event. Some arc force controls may have both a static and dynamic characteristic. In such embodiments, the static characteristic may control the steady state magnitude of the current increase during a short circuit event while the dynamic characteristic may control the rate of change of the output current during a short circuit event as well as after a short circuit event. The static and/or dynamic arc force characteristics may be modified by varying one or more arc force constants. In some embodiments, an arc force constant may be used within a mathematical calculation, by a suitable circuit, software, or any other suitable device to modify the arc force characteristics. Some welding power sources may enable the operator to adjust the static and/or dynamic arc force characteristics, such as with knobs 30.

One or more characteristics of the short circuit events 74, 76, 78, and 80 may be a function of factors such as the type of electrode being utilized in the welding operation, current setting of the power source, and so forth. For example, the duration of the short circuit or the time required for the short to clear may be affected by the static and dynamic arc force characteristics of the power source and may be indicative of weld parameters such as the electrode type. In the illustrated embodiment, in response to the detected short circuit events 74, 76, 78, 80, and 82, the current plot 62 exhibits current spikes 100, 102, 104, 106, and 108 due to the arc-force response to the short circuit events 74, 76, 78, 80, and 82.

Figure 4A:
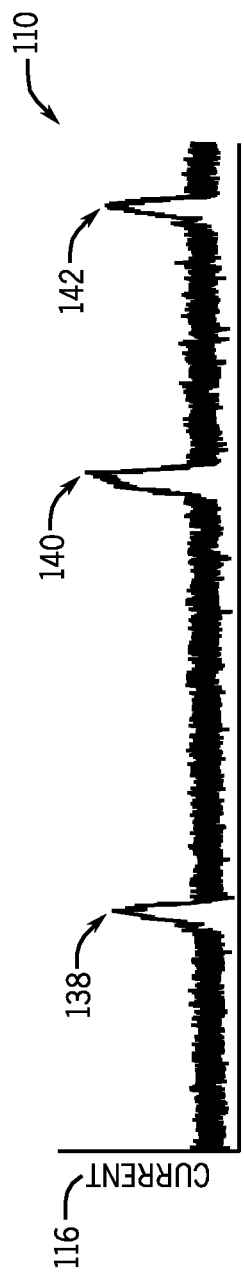
FIG. 4A illustrates an exemplary current versus time plot for an exemplary welding operation in accordance with embodiments of the present invention.
Figure 4B:
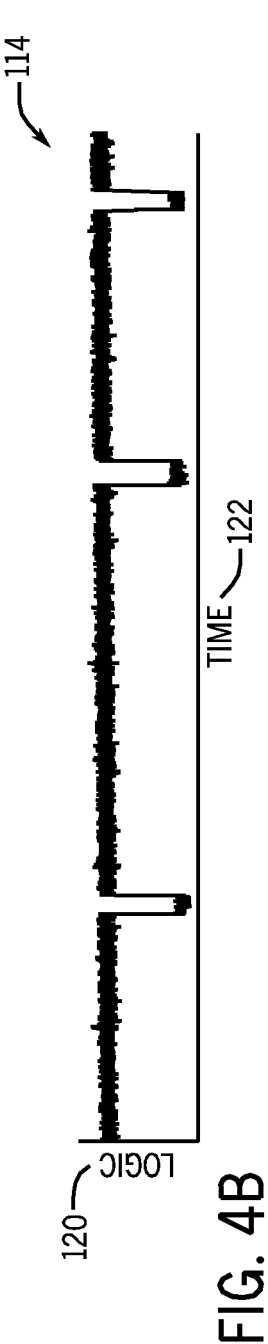
FIG. 4B illustrates an exemplary logic signal versus time plot for an exemplary welding operation in accordance with embodiments of the present invention.
Figure 4C:
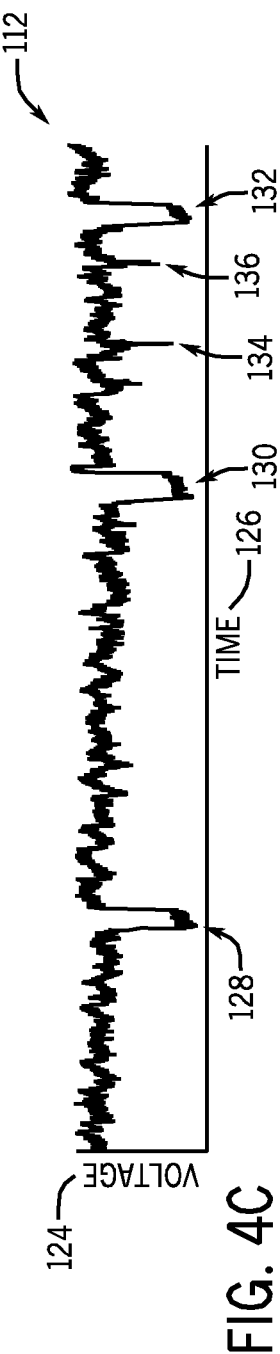
FIG. 4C illustrates an exemplary voltage versus time plot for an exemplary welding operation in accordance with embodiments of the present invention.

In certain embodiments, the weld controller may statistically analyze certain features of one or both of the current and/or voltage plots to determine a statistical signature of the welding operation while being performed. For example, the statistical signature of a welding process may include features such as the frequency of the short circuit occurrences, the duration of the short circuits, and so forth. To that end, the presence of a short circuit may be detected by the controller, for example, by comparing the instantaneous magnitude of the voltage waveform to a threshold. For example, in certain embodiments, the threshold may be a fixed value or a function of the average voltage. FIGS. 4A, 4B, and 4C illustrate an embodiment of such short circuit detection logic.

Specifically, FIG. 4A illustrates an exemplary current versus time plot 110, FIG. 4C is an exemplary voltage versus time plot 112, and FIG. 4B is an exemplary logic signal versus time plot 114. The current plot 110 includes a current axis 116 and a time axis 118. The logic signal plot includes a logic signal strength axis 120 and a time axis 122, and the voltage plot 112 includes a voltage axis 124 and a time axis 126. As shown, a variety of short circuit events 128, 130, and 132 and transient short circuit events 134 and 136 occur in the voltage plot 112. The current plot 110 exhibits a response to the short circuit events 128, 130, and 132 with current peaks 138, 140, and 142. Similarly, the logic signal plot 114 detects the short circuit events 128, 130, and 132 while disregarding the transient short circuit events 134 and 136. In such a way, the controller may be configured to identify the short circuit events 128, 130, and 132 by utilizing a duration threshold in addition to a voltage threshold. For example, as in the illustrated embodiment, if a short circuit duration does not exceed a predefined threshold, the event is not detected by the logic signal 114 and, accordingly, may not be utilized by the controller in a subsequent statistical analysis. In some embodiments, the predefined duration threshold for detecting a short circuit event and disregarding a transient short circuit event may be between approximately 0.3 mSec and approximately 1 mSec. Further, it should be noted that in additional embodiments, the controller may also be configured to disregard short circuit events that exceed a predefined duration threshold, for example, short circuit events that result from the weld operator shorting the electrode to the work and are not indicative of one or more characteristics of the weld electrode. In some embodiments, the predefined duration threshold for disregarding short circuits, which may result from the weld operator shorting the electrode, may be between approximately 50 mSec and approximately 100 mSec.

In some embodiments, the controller may be configured to statistically analyze one or both of the current plot 110 and the voltage plot 112 during the welding operation to determine a statistical signature associated with one or more parameters of the welding operation. The statistical signature may include one or more statistical determinations or calculations, such as average current, average voltage, average short circuit duration, percentage of short circuits that fall within a narrow time window, short circuit frequency, standard deviations, RMS values of voltage or current, or any number of other suitable calculations. In some embodiments, a narrow short circuit may be a short circuit with a duration that falls within a narrow time window, for example, with a duration that falls within an upper and lower duration threshold, as described above. Further, in some embodiments, a narrow short circuit may be defined as a subset of short circuit events. For example, in one embodiment, a narrow short circuit may be defined as a short circuit with a duration greater than approximately 1 mSec and less than approximately 5 mSec.

In one embodiment, the controller may statistically analyze the voltage plot 112 and the current plot 110 to determine the electrode type being utilized in the welding operation. In such an embodiment, based on at least one of the average current, the average short circuit duration, and the percentage of narrow short circuits, the controller may determine the electrode type. For example, the controller may compare the obtained measurements and/or calculated statistical values to a reference table to determine which electrode type exhibits the observed behavior. The controller may utilize linear approximations, lookup tables, or any other suitable method to determine the electrode type. For instance, a 3/32" E6010 electrode may be associated with an average short circuit duration which is substantially lower than that of a 3/32" E7018 electrode. For further example, a 1/8" E6010 electrode may exhibit a substantially greater percentage of narrow short circuits than a 1/8" E7018 electrode. Such differences in the statistically determined characteristics of the welding operation may be utilized by the controller to determine, for example, the electrode type being utilized.

Figure 5:
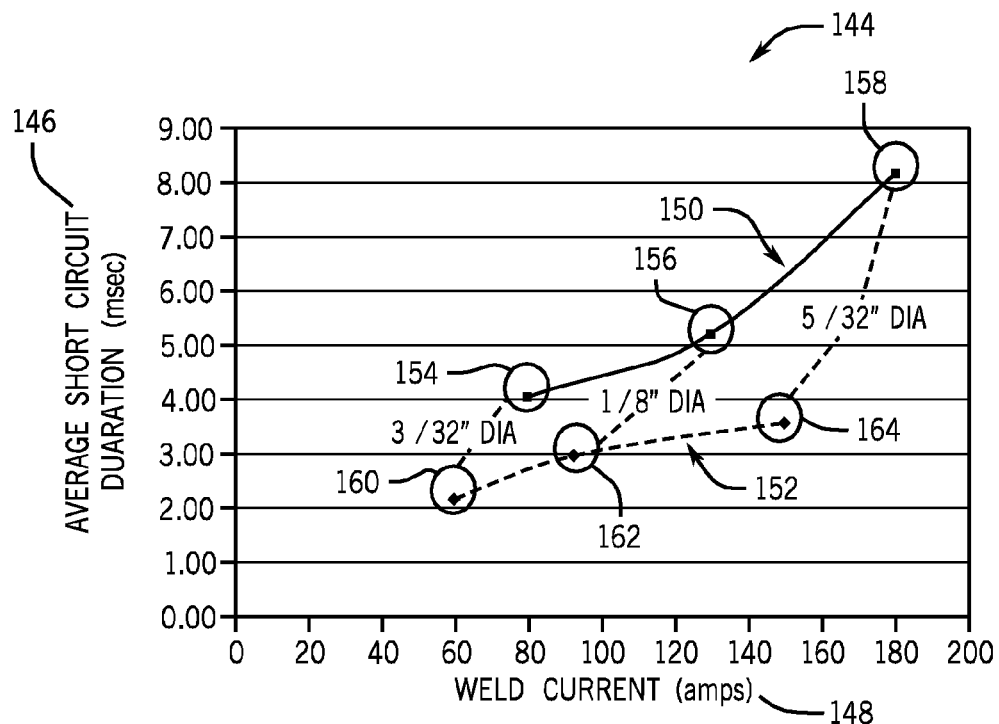
FIG. 5 illustrates a plot of exemplary statistically determined average short circuit durations versus weld current for electrodes of different diameters and types in accordance with embodiments of the present invention.

FIG. 5 illustrates a plot 144 of exemplary statistically determined average short circuit durations versus weld current for electrodes of different diameters and types. The plot 144 includes an average short circuit duration axis 146 and a weld current axis 148. The plot 144 further includes a first electrode type plot 150 and a second electrode type plot 152. The first electrode type plot 150 includes a statistical signature associated with the first electrode type and a first diameter (e.g., 3/32") 154, a signature associated with the first electrode type and a second diameter (e.g., 1/8") 156, and a signature associated with the first electrode type and a third diameter (e.g., 5/32") 158. Similarly, the second electrode type plot 152 includes a statistical signature associated with the second electrode type and the first diameter 160, a signature associated with the second electrode type and the second diameter 162, and a signature associated with the second electrode type and the third diameter 164.

As illustrated, statistical differences based on the weld current and the average short circuit duration may be utilized by the controller to determine which electrode type and diameter is being utilized in the welding operation. That is, in one embodiment, the controller may compare the determined average short circuit duration and the weld current level to a reference chart, such as the plots in FIG. 5, to determine the weld electrode type and diameter. Although only two plots are illustrated in the embodiment of FIG. 5, any number of plots associated with any desired number of possible electrodes may be provided in the reference charts of additional embodiments. Further, once the electrode type and/or diameter is determined by the controller, one or more settings or parameters most suitable for use with the determined electrode type or diameter may be implemented for the remainder of the welding process. Still further, in some embodiments, the weld controller may utilize additional statistical values when determining the type or diameter of the electrode being utilized. Such additional values may include but are not limited to average voltage level, average or set current level, root mean square values of voltage and/or current, power, average arc duration (i.e., portion of the waveform between short circuits), standard deviations of the measured values, or any other suitable statistical parameter.

Figure 6:
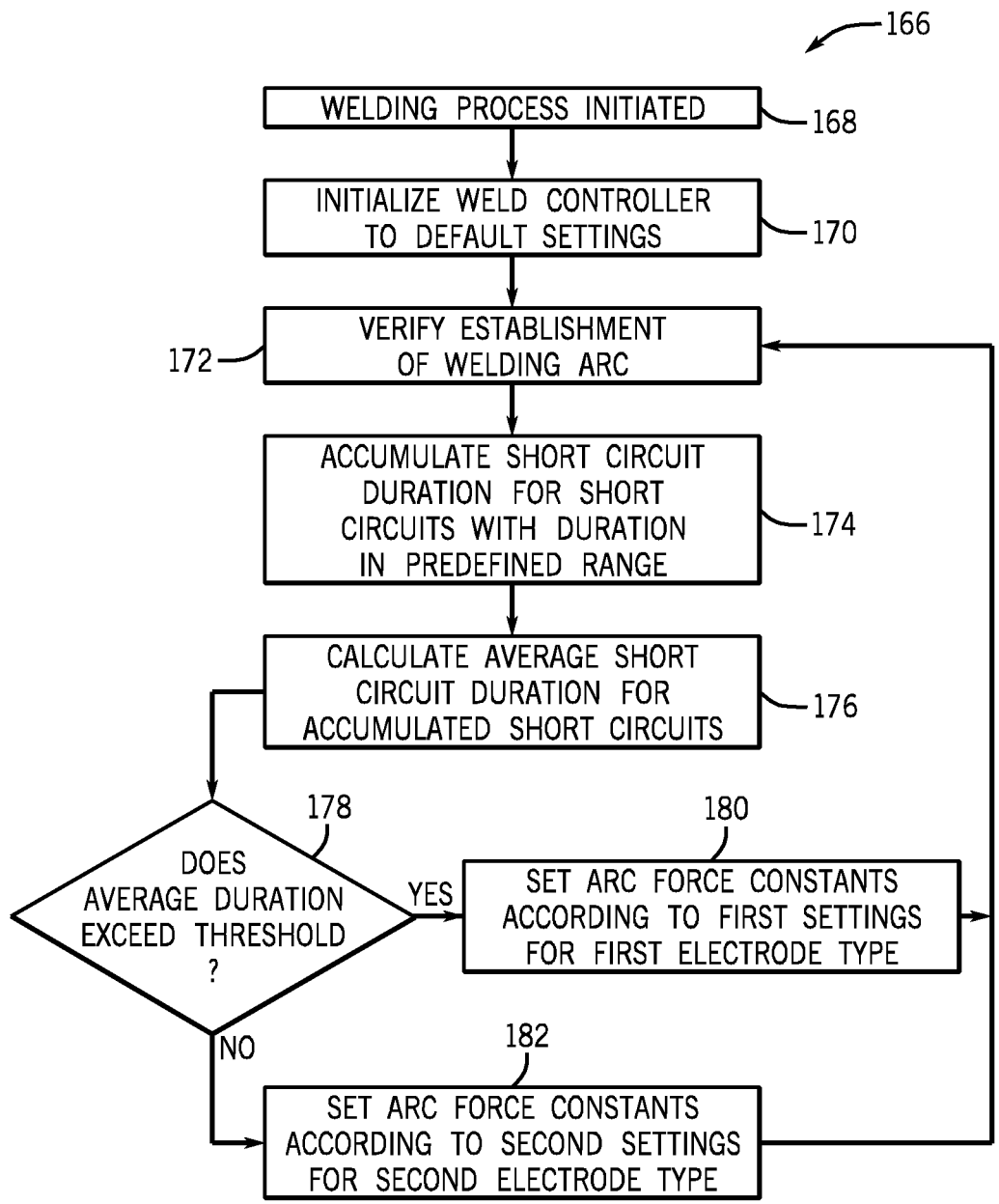
FIG. 6 illustrates an exemplary method that may be utilized by the controller to detect the type of electrode being utilized in the welding operation and to set one or more parameters suitable for use with the determined type of electrode in accordance with embodiments of the present invention.

FIG. 6 illustrates an exemplary method 166 that may be utilized by the controller to detect the type of electrode being utilized in the welding operation and to set one or more parameters suitable for use with the determined type of electrode. The method 166 includes the step of detecting that a welding process has been initiated (block 168) and initializing the weld controller to one or more default settings (block 170). For example, before the welding operation begins and the statistical analysis is performed, the parameters for the startup period may be default settings such as the settings associated with the last electrode type utilized in the machine, settings input by an operator, settings associated with the welding power source, or any other set of default settings.

The method further includes the steps of verifying that a welding arc is established (block 172) and accumulating the short circuit duration for short circuits with a duration in a predefined range (block 174). That is, for the short circuit events that are not determined to be transient short circuits by the controller, the short circuit duration is tracked. Further, the accumulation of short circuit durations may continue until a predefined number of short circuits have been accumulated and/or until a predetermined time threshold has been exceeded. Still further, the average short circuit duration for the accumulated short circuits is calculated (block 176). In this embodiment, the calculated average short circuit duration is compared to a threshold (block 178) to make a determination as to which type of welding electrode is being utilized or to distinguish between two or more possible electrode types. If the calculated average duration does exceed the threshold, the arc force constants are set according to a first parameter set associated with a first electrode type (block 180). However, if the calculated average duration does not exceed the threshold, the arc force constants are set according to a second parameter set associated with a second electrode type (block 182). After adjusting the arc force constants based on the average short circuit duration, the controller may continue to monitor the welding operation each time a welding arc is established to determine whether or not a change in electrode type has been established.

Such a method may be utilized by the controller to check the electrode type throughout the welding operation while the welding operation is occurring and to set parameters of the welding process according to the determined electrode type. Further, if an operator switches the electrode type during the welding operation, embodiments of the illustrated method may be utilized to adjust the arc force constants to values appropriate for the current electrode being utilized. In such a way, in some embodiments, the average short circuit duration may be determined by the controller and utilized as a statistical signature of the welding process in accordance with embodiments of the present invention.

Figure 7:
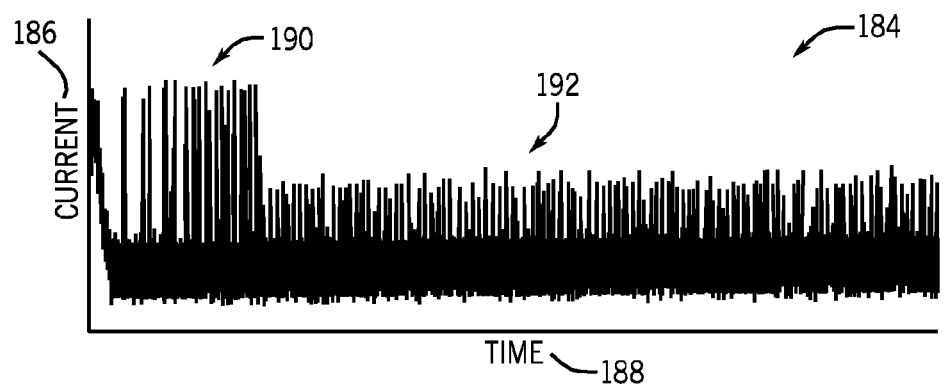
FIG. 7 illustrates an embodiment of a current versus time plot that may be generated during an exemplary welding operation when controlled according to the method of FIG. 6.

FIG. 7 illustrates an embodiment of a current versus time plot 184 that may be generated during an exemplary welding operation when controlled according to the method of FIG. 6. Accordingly, the plot 184 includes a current axis 186 and a time axis 188. In this embodiment, during a startup period, the controller initializes one or more default settings, which are utilized until a statistical analysis is performed and an optimized parameter set may be implemented based on the results of the statistical analysis. As illustrated, for a first portion 190 of the waveform, a default set of arc force constants associated with a default electrode type (e.g., E6010) are implemented. During the first portion 190 of the waveform, the average duration of the short circuit events is determined by the controller. In the illustrated embodiment, by analyzing the average short circuit duration, the controller determines that a second electrode type (e.g., E7018) is being utilized, and the arc force constants are adjusted to produce the steady state portion 192 of the current waveform. As such, according to the method of FIG. 6, embodiments of the presently disclosed controllers may alter one or more weld parameters during the welding operation based on a statistical analysis.

Figure 8:
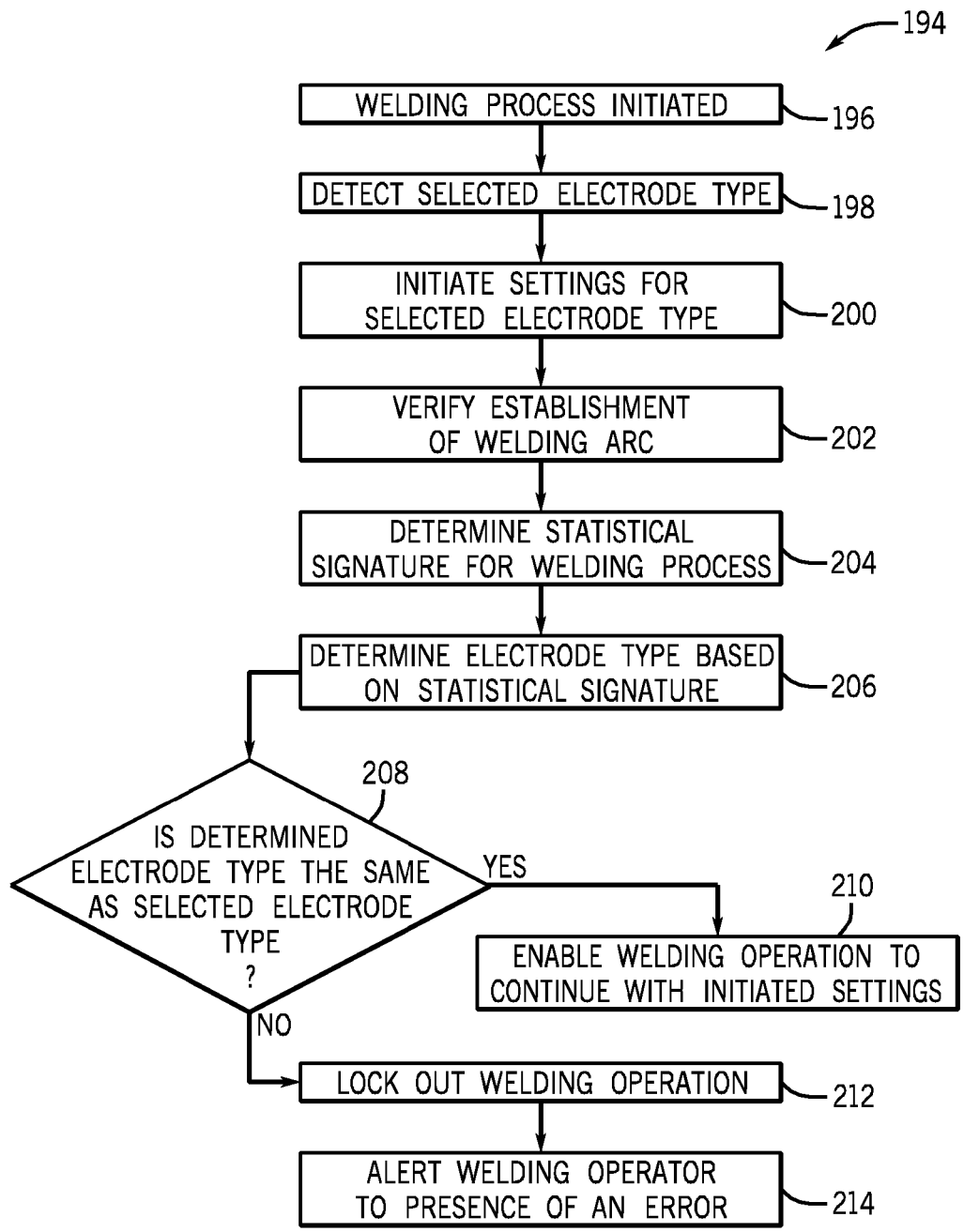
FIG. 8 illustrates an embodiment of a method that may be utilized by embodiments of the controllers disclosed herein to statistically determine an electrode type being utilized and to compare the determined type to a preset electrode type.

FIG. 8 illustrates an exemplary method 194 that may be utilized by embodiments of the controllers disclosed herein to statistically determine an electrode type being utilized and to compare the determined type to a preset type. Such a method may be utilized, for example, to substantially reduce the likelihood of a user operating a welding power source while utilizing an undesired electrode. The method 194 includes the steps of detecting that a welding process is initiated (block 196) and subsequently detecting the selected electrode type (block 198). For example, the selected electrode type may be the type of electrode specified by the user via a control panel. The controller is further adapted to initiate the settings associated with the selected electrode type (block 200) and to verify establishment of a welding arc (block 202). Once the welding arc is established, the controller determines a statistical signature for the welding process (block 204) and determines the electrode type being utilized based on the statistical signature (block 206) as described in detail above.

The controller further performs a check as to whether the electrode type being utilized in the welding operation is the same as the electrode type selected by the welding operator (block 208). If the selected electrode type matches the determined electrode type, the current settings are verified and the welding operation is enabled to continue (block 210). However, if the selected electrode type and the determined electrode type do not match, the welding operation is locked out (block 212), and the welding operator is alerted to the presence of an error (block 214). However, in alternative embodiments, the welding operation may not be locked out, but the welding operator may still be alerted to the presence of an error. In such a way, the determined electrode type may be utilized by the controller for a variety of desired purposes, such as to verify that the correct electrode is being utilized in the welding operation.

Figure 9:
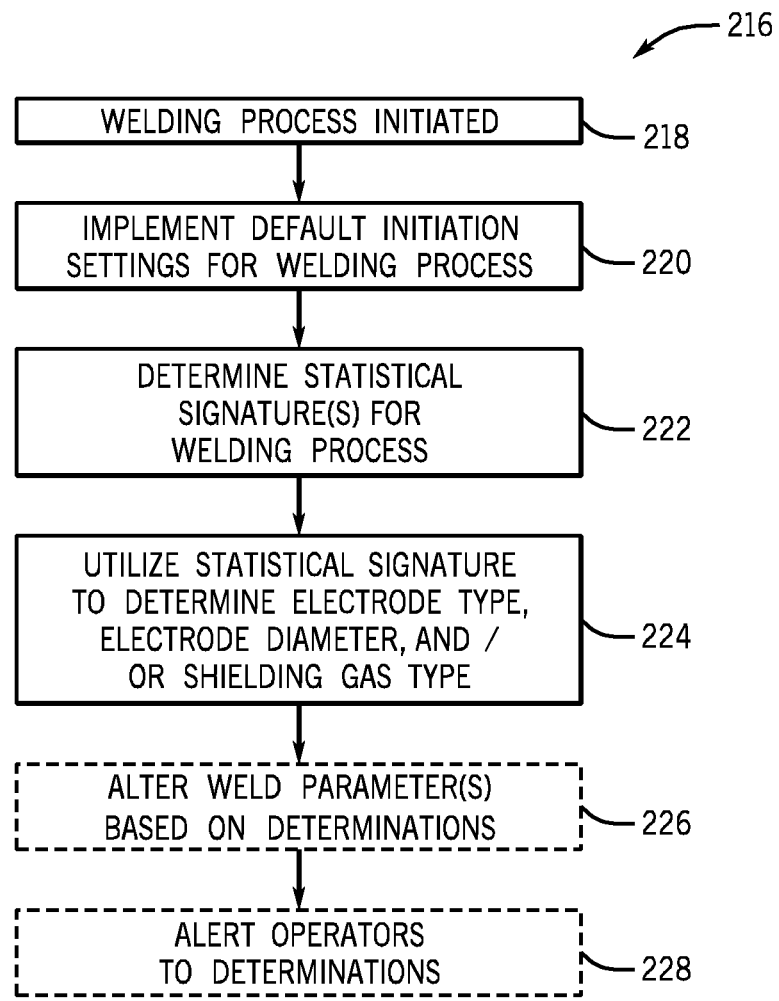
FIG. 9 illustrates an embodiment of a method that may be utilized by an embodiment of a weld controller to perform one or more statistical determinations regarding a GMAW or a FCAW welding operation during the occurrence of such an operation.

FIGS. 9-13 illustrate embodiments of the present invention as applied to gas metal arc welding (GMAW) and flux-cored arc welding (FCAW). Specifically, FIG. 9 illustrates a method 216 that may be utilized by an embodiment of a weld controller to perform one or more statistical determinations regarding a GMAW or a FCAW welding operation during the occurrence of such an operation. The method 216 includes detecting initiation of a welding process (block 218) and implementing the default initiation settings for the selected welding process (block 220). The method 216 also includes determining a statistical signature for the welding process (block 222), as described in detail above for the SMAW processes. However, in this embodiment, the method includes utilizing the statistical signature to determine one or more of the electrode type, the electrode diameter, and the shielding gas type being utilized in the welding operation (block 224). In some embodiments, if desired by the operator, the controller may alter one or more weld parameters of the welding operation based on the one or more determinations (block 226) and/or may alert the operator to the determinations and/or the suggested weld parameters (block 228).

In embodiments of the present invention as applied to GMAW and/or FCAW systems, the statistical analysis performed on one or more of the welding waveforms may be utilized to determine the electrode type as well as the shielding gas type being utilized during the welding operation. Such a determination may be utilized to determine suitable weld parameters, such as the dynamic and static behavior of the welding system. As such, each electrode and shielding gas combination may be associated with a unique set of desired settings. For example, it may be desirable to control the dynamic behavior of the welding system with a lower value of electronic inductance (i.e., the rate of change of the weld current) when welding with 100% $CO_2$ shielding gas as compared to welding with 75% Ar and 25% $CO_2$ as the shielding gas with the same type of weld electrode. Indeed, a variety of weld settings may be adjusted based on the particular combination of the weld electrode type and the shielding gas type detected.

Figure 10:
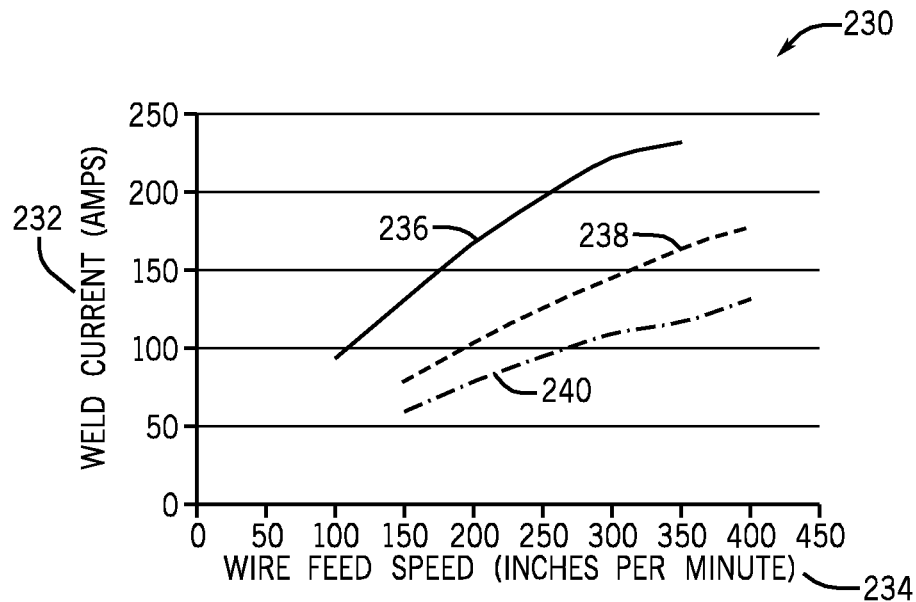
FIG. 10 illustrates exemplary statistical signatures associated with a variety of weld wires composed of the same material and having different diameters in accordance with embodiments of the present invention.

FIG. 10 illustrates exemplary statistical signatures associated with a variety of weld wires composed of the same material (e.g., mild steel) but having different diameters. Specifically, FIG. 10 illustrates a weld current versus wire feed speed plot 230 including a weld current axis 232 and a wire feed speed axis 234 for an exemplary GMAW process. As illustrated, the statistical signature for a first wire with a first diameter (e.g., 0.045") 236 exhibits a different profile than the statistical signature for a second wire with a second diameter (e.g., 0.035") 238, which is different than the statistical signature for a third wire with a third diameter (e.g., 0.030") 240. In some embodiments, by determining the weld current versus wire feed speed profile of the occurring weld operation, the controller may determine, via comparison with the profiles 236, 238, and 240, the diameter of the weld wire being utilized. The controller may utilize additional inputs or measurements, such as weld voltage, as part of the profile to determine the diameter of the weld wire being utilized. Subsequently, if desired, the controller may adjust one or more weld parameters predetermined for use with the determined wire diameter.

Figure 11:
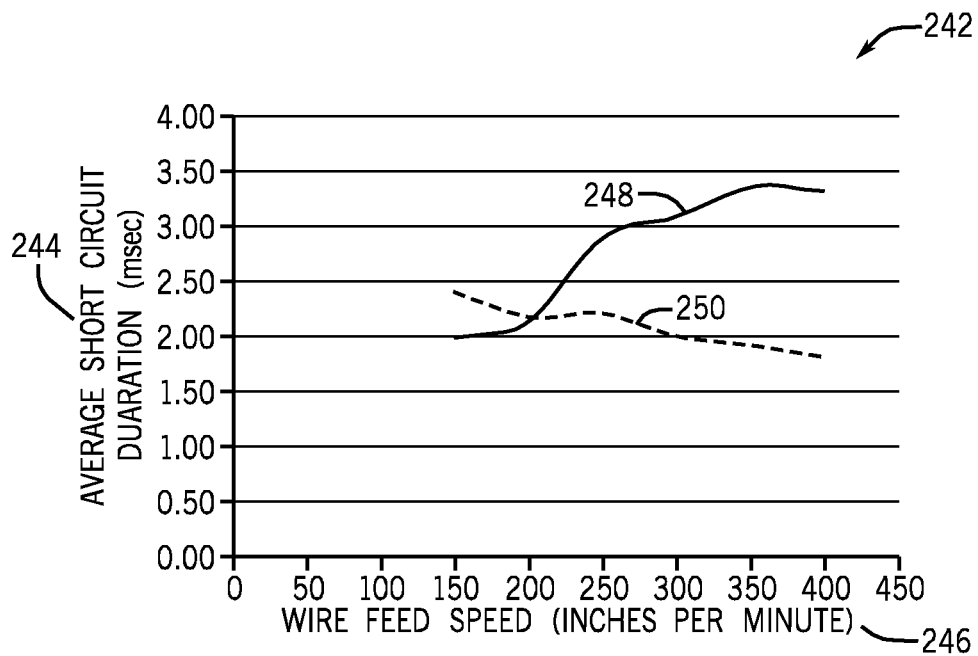
FIG. 11 illustrates an embodiment of a short circuit duration versus wire feed speed plot showing exemplary statistical signatures associated with a given electrode being utilized in GMAW welding operations with different shielding gases.

FIG. 11 illustrates a short circuit duration versus wire feed speed plot 242 showing exemplary statistical signatures associated with a given electrode being utilized in GMAW welding operations with different shielding gases. The plot 242 includes an average short circuit duration axis 244, a wire feed speed axis 246, a waveform 248 associated with a first shielding gas type (e.g., 100% $CO_2$), and a waveform 250 associated with a second shielding gas type (e.g., 75% Ar and 25% $CO_2$). As shown, by determining the average short circuit duration during a welding operation and comparing to a reference average short circuit duration versus wire feed speed, the controller may utilize the statistical characteristics of the welding process to determine the type of shielding gas being utilized in the GMAW operation. For example, the controller may compare the average short circuit duration to one or more reference plots (e.g., 248 and 250) to determine the shielding gas type. It should be noted that although only two profiles associated with two types of shielding gas are illustrated in FIG. 11, any suitable number of plots may be provided in alternate embodiments.

FIG. 12 illustrates a short circuit frequency versus wire feed speed plot 252 showing exemplary statistical signatures associated with a given electrode being utilized in a GMAW welding operation with different shielding gases. The plot 252 includes an average short circuit frequency axis 254, a wire feed speed axis 256, a first waveform 258 associated with a first shielding gas type (e.g., 100% $CO_2$), and a second waveform 260 associated with a second shielding gas type (e.g., 75% Ar and 25% $CO_2$). In this embodiment, by comparing the average short circuit frequency versus the wire feed speed, the controller may determine the type of shielding gas being utilized in the given welding operation. As before, additional shielding gas types may also be provided on the plot 252 in other embodiments.

It should be noted that in some embodiments, one or more reference charts may be utilized by the controller to determine and/or verify the shielding gas and/or electrode type being utilized in the GMAW or FCAW process. For example, in certain embodiments, the controller may utilize both the short circuit duration as well as the short circuit frequency versus the weld wire feed speed to determine and then check that a correct determination as to the type of shielding gas has been made. Still further, in other embodiments, the controller may first determine the electrode type and, subsequently, may determine the shielding gas type. Additionally, in some embodiments, the controller may distinguish between two or more electrode types and may further distinguish between two or more shielding gas types. Based on both determinations and/or distinctions, the controller may then recommend or implement a suitable weld parameter set for the given welding operation. As before, the controller may dynamically analyze and control the welding operation while the operation is occurring.

FIG. 13 illustrates an exemplary method 262 that may be utilized by a controller to control a GMAW or FCAW process in accordance with embodiments of the present invention. The method 262 includes detecting initiation of the welding process (block 264) and implementing a set of default initiation settings for the welding process (block 266). Further, the method 262 includes determining an average short circuit duration versus wire feed speed signature (block 268) and an average short circuit frequency versus wire feed speed signature (block 270) for the given operation. Based on the determined signatures, the controller is configured to determine the shielding gas type (block 272) as discussed in detail above.

Still further, the method 262 includes determining a current versus wire feed speed signature (block 274) and, subsequently, determining the diameter of the electrode based on the determined signature (block 276). Again, such determinations may be made, for example, by comparing the determined statistical signatures to one or more reference signatures or charts. In some embodiments, the controller may recommend one or more weld settings to the weld operator based on the statistical analysis (block 278) and/or may alter one or more weld parameters based on such determinations (block 280).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
   a welding power source comprising power conversion circuitry configured to receive primary power and to convert the primary power to a weld power output for use in a welding operation; and
   a controller communicatively coupled to the welding power source and configured to determine a statistical signature of at least one parameter of a welding process by statistically analyzing a current versus time waveform of the welding operation, a voltage versus time waveform of the welding operation, or both, and to utilize the statistical signature to determine at least one of an electrode type, an electrode diameter, and a shielding gas type during the welding operation.

2. The welding system of claim 1, wherein the at least one parameter comprises one or more of an average short circuit duration, an average short circuit frequency, a current versus wire feed speed profile, and a percentage of total short circuits that exceed a predefined threshold.

3. The welding system of claim 1, wherein the controller is further configured to adjust one or more settings of the welding process during the welding operation based on one or more of the determined electrode type, the determined electrode diameter, and the determined shielding gas type.

4. The welding system of claim 1, wherein the controller is further configured to determine a second statistical signature of at least one parameter of a second welding process by statistically analyzing a second current versus time waveform of the welding operation, a second voltage versus time waveform of the welding operation, and to utilize the second statistical signature to determine at least one of an electrode type, an electrode diameter, and a shielding gas type during a second welding operation, wherein the first welding process occurs when a first welding arc is initiated and the second welding process occurs when a second welding arc is initiated.

5. The welding system of claim 4, wherein the controller is configured to determine whether there is a difference between the statistical signature and the second statistical signature and if there is a detected difference, the controller adjusts one or more settings of the second welding process.

6. The welding system of claim 1, wherein the controller is further configured to alert an operator to the determined electrode type, electrode diameter, and/or shielding gas type during the welding operation.

* * * * *